H. BESSEMER.
MANUFACTURE OF IRON AND STEEL.
No. 94,997.  Patented Sept. 21, 1869.
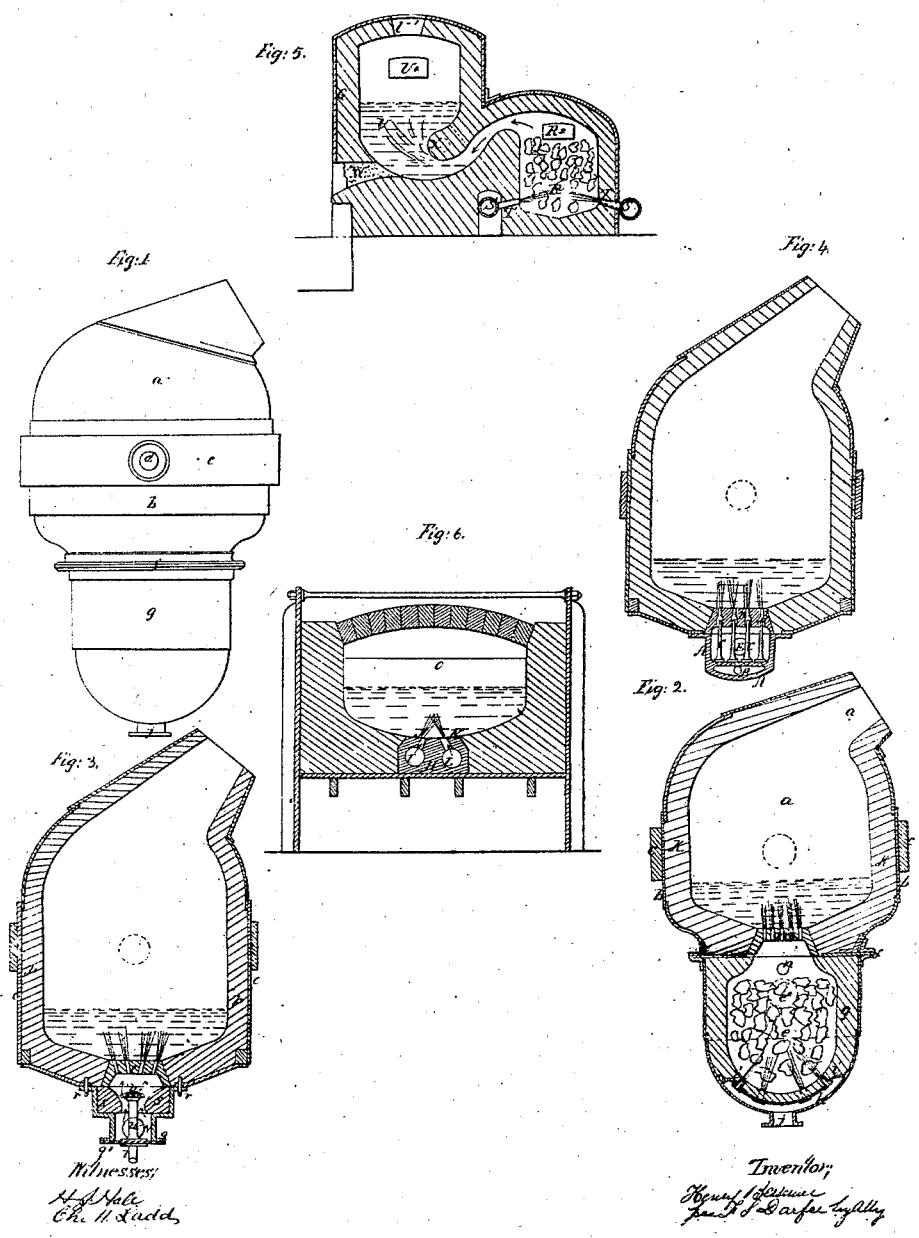

United States Patent Office.

HENRY BESSEMER, OF LONDON, ENGLAND.

Letters Patent No. 94,997, dated September 21, 1869; patented in England, March 31, 1868.

IMPROVEMENT IN THE MANUFACTURE OF IRON AND STEEL.

The Schedule referred to in these Letters Patent and making part of the same

*To all to whom it may concern:*

Be it known that I, HENRY BESSEMER, of Queen Street Place, Cannon street, in the city of London, a subject of the Queen of Great Britain, have invented or discovered new and useful "Improvements in the Manufacture of Malleable Iron and Steel, in the Heating and Melting of Metals, and in the Machinery or Apparatus employed for such Purposes;" and I, the said HENRY BESSEMER, do hereby declare the nature of the said invention, and in what manner the same is to be performed, to be particularly described and ascertained in and by the following statement thereof; that is to say—

It is well known to engineers and others that malleable iron and steel that has been rendered homogeneous in structure by fusion is much better adapted for a variety of purposes in the arts than iron or steel that has not been so treated.

It is also well known that the process of puddling iron, and some other processes in which the metal passes into a granular, or more or less solid state, are found to remove so much of the phosphorus, and other impurities usually found in combination with the cheap and inferior qualities of pig-iron, as greatly to improve the quality of the metal, while rendering such iron malleable.

The extremely high temperature, however, which is necessary to bring decarbonized or malleable iron or steel into a state of complete fusion has hitherto been a great bar to the conversion of such puddled or malleable metal into homogeneous iron or steel.

Now, therefore, one important object sought to be accomplished by means of my present invention is a more ready and less expensive means of fusing decarbonized or partly decarbonized iron or malleable iron or steel, by means of the combustion of solid, gaseous, or liquid fuel, in such manner that the heat generated by their combustion shall be applied in numerous powerful jets or streams, as from a number of blow-pipes, such jets or streams of fire, or gaseous or fluid combustible matter, in combination with atmospheric air, being forced or driven in between or among the solid pieces of metal to be fused, and into and among the particles of fluid metal derived from their fusion, and into and among the particles of any fluid carburet of iron that may be added to the charge of malleable metal, for the purpose of facilitating its fusion, or of adding the necessary quantity of carbon thereto, the flame, or matters employed to produce flame, being forced upward into the metal through tuyeres in a manner similar to that by which atmospheric air is now forced into fluid iron in the Bessemer process, or the metal may be fused by forcing jets of air and jets of combustible gases or liquid fuel, either separately or combined, in among the pieces of metal to be fused, and into any fused portion thereof, or into any carburet of iron that may be added thereto, and form part of the charge.

The metal to be fused may be put cold into the vessel or furnace where its fusion is to take place, or it may be previously heated to a red or white heat in any other suitable furnace, and which preliminary heating is in most cases to be preferred.

The fusion, however, of the metal may be effected in a gas or other reverberatory furnace, in which it may have been puddled, or otherwise more or less decarbonized or rendered malleable by employing, in combination with the heat of such furnaces, my improved mode or modes of heating and fusing malleable metal by jets or streams of fire, or jets of the gaseous or fluid combustible matters before referred to.

But although I have shown how my invention may be used in conjunction with other furnace-heat, I nevertheless desire it to be understood that I prefer to employ, for the purposes of my invention, a vessel or converter, mounted on axes, the chamber for burning solid fuel, or the chamber in which the gaseous or liquid fuel is ignited, forming part of the apparatus, moving on trunnions, through or around which trunnions the air and the gas or liquid fuel are conveyed by pipes from suitable reservoirs.

And in order that the mode in which I prefer to employ solid fuel for the purposes of my invention may be fully understood, I have shown, on the sheet of drawings hereunto annexed, an elevation of an apparatus suitable for that purpose at Figure 1, and a vertical section of the same at Figure 2.

The melting or converting-chamber *a* consists of an outer casing of plate-iron, *b*, riveted together, having a trunnion-band, *c*, passing around it, from which projects the trunnion *d*, and through which passages are formed for the purpose of passing air into the fuel-chamber below.

The melting-chamber *a* is lined with gaunister *k*, or other refractory material, and is similar in construction to the converting-vessels now generally used in the "Bessemer process."

Beneath the melting-chamber *a* is the fire-box *e*, which is fixed to the melting-chamber by means of the flanges *f*. The fire-box may also have a lining of gaunister or fire-brick, *g*.

In the lower part of the fire-box a space, *h*, is formed by a diaphragm of iron, having several nozzles or tuyere-pipes *i* fitted to it.

These tuyeres extend through the lining *g*, and convey numerous powerful blasts of air (heated or cold) in among the fuel, in order to promote an intense combustion, the air being conducted by a pipe (not shown) from the trunnion *d* down to the flanged opening *j* communicating with the space *h*.

An opening or door on the side of the fire-box is shown by dots at $e^x$, for the admission of fuel, and is secured against the pressure of the blast by a faced metal joint and plate, or by a feeding-valve, such as is employed in cases where fires are made in closed chambers.

There is fitted into the lower part of the melting-vessel a tuyere or tuyeres $m$, made of fire-clay, plumbago, or other refractory material. The tuyere is to be replaced by a new one as often as required, by removing the fire-box from the melting-chamber.

When a new tuyere is fixed some luting of clay is put on the upper surface of the lining $g$ of the fire-box, and the flanges $f$ screwed home, which will secure the joint, and retain the tuyere $m$ in place.

When employing this apparatus, it is mounted on a frame, in which it may be moved on its axis in a manner similar to the ordinary Bessemer converting-vessel.

A fire of good pure hard coke may be made in the fire-box, using by preference a low pressure of blast until the heat and flame passing through the tuyeres $m$ have heated the melting-chamber $a$. A fresh charge of fuel is then put in, and the box $e$ is well filled.

The apparatus may then be moved on its axis until the mouth $a^*$ is in a convenient position for the introduction of the metal to be fused or converted therein, and which may consist of steel or iron in a solid state, which has, by some previous process or processes, been more or less purified, decarbonized, or rendered malleable and difficult of fusion, or the metal may consist of any of the qualities or kinds hereinafter more particularly designated.

I prefer to heat such solid metal to a full red or white heat in any convenient furnace, prior to putting it into the melting-chamber, although it will be obvious that it may be put therein alone or with a portion of pig-iron, each being in a cold or unheated state.

When the metal to be fused is put into the chamber $a$, a powerful blast is turned on, preferably at a pressure of ten to twenty pounds per square inch. The air at this pressure, passing through the tuyeres $i$, will cause an intense combustion of the fuel, and the heat and flame emitted therefrom will pass up among the pieces of metal to be fused.

As soon as the pieces of metal are heated to whiteness, or show signs of fusion by the emission of sparks, the vessel may be turned quickly down, and receive a charge of molten pig or other carburet of iron.

By preference, I employ grey hematite pig-iron, or a mixture of it, and white spathose pig-iron. The metal so added may form one-fourth to three-fourths of the whole weight of metal treated.

As soon as the fluid carburet is run into the vessel, it is again turned up into the position shown in the drawings, the flame and heated products of combustion will be driven through the fluid metal, and also in among the solid portions of the charge, diffusing itself in numerous fiery bubbles throughout the metal under treatment, raising the fluid portions thereof to an intense heat, but without rapidly decarbonizing the metal, as in the ordinary Bessemer process, where pure air is used; and hence the accumulation of heat may go on until the complete fusion of the solid malleable constituents of the charge has been effected.

If a larger quantity of pig or carburet of iron be employed than is sufficient to produce steel of the desired quality when united with the malleable metal which formed part of the charge, and also in those cases where it is desired to produce soft malleable iron, air may be admitted to the melting-chamber at or near the end of the process, by opening a valve, and allowing the air to be forced into the fire-box at $n$, above the level or upper surface of the fuel, and from thence pass through the tuyeres $m$, without having first passed the fuel. The air so admitted will rapidly deprive the metal of its remaining carbon, and at the same time give an additional heat to it.

When the whole charge is in a fluid state, it may be poured from the chamber $a$ by tipping the chamber on its axis, as is well understood, the metal being received into a casting-ladle, where an addition may be made to it of some molten spiegel-eisen, or ferro-manganese, previous to running the metal into moulds.

It will be obvious that any substances that are vaporized by intense heat, which it is desired to pass in the gaseous form through molten iron, with a view to improve or alter its quality, may be put into the fire-box before the commencement of the melting-process, or may be conveyed therein from time to time by the blast. It will also be understood that any substances which may be found useful, or that have hitherto been employed to purify or alter the quality of iron in other processes, may also be put into the melting-vessel in my improved process; but I desire it to be understood that I lay no claim to the use or application of such substances, either in the fire-box or melting-chamber of this apparatus. I desire it also to be understood, that not only may such melting-vessel or converter be employed for the purpose of fusing decarbonized or partially-decarbonized iron or steel made in other furnaces or apparatus, but it may be advantageously employed to decarbonize and purify the crude, or impure metal, which is afterward to be fused therein, by employing any of the methods now known or practised, whereby impure or inferior pig-iron may be rendered more or less malleable, or converted into malleable iron or steel, and in which processes the metal assumes a more or less granulated or solid condition, and, hence, requires the after process of fusion.

When the vessel for melting the malleable metal is also employed to decarbonize, or purify the metal to be melted therein, I prefer to construct the vessel with two hearths, or divisions, as described in a provisional specification already filed by me in England, and dated the 21st day of March, 1868, No. 967, and in a complete specification to the same, which was duly filed on the 21st day of September 1868, the second hearth of the vessel described in the aforesaid specification being provided with a fire-box below the tuyeres, in lieu of the tuyere-box there shown, and which fire-box is similar to that represented in figs. 1 and 2 on the annexed drawings, so that the fusion of the metal treated with air and steam on the first half of the converting-vessel may be effected by jets of flame and heated products of combustion, as already described in respect to the figs. 1 and 2, in lieu of by atmospheric air alone.

When furnace-heat is necessary in any such preliminary processes of purifying pig-iron and rendering it malleable, the same may be applied by means of jets of fire or combustible gases, as hereinbefore described, the final fusion of the metal also being effected by these jets of flame, or gases, or fluids capable of producing them.

The materials to be fused by my improved means, and thereby converted into homogeneous iron or steel, alone or in combination with a portion of any carburets of iron, may consist of puddled iron or steel, in its early, or granular, or loose state, or in a more advanced state of manufacture, such as puddled balls, blooms, or puddled bars cut into convenient pieces. The materials may also consist of any semi-fluid, granular, or more or less concrete malleable metal, that has been obtained by the action of nitrate of soda or nitrate of potash, or by analogous or other substances containing, or capable of yielding oxygen on coming in contact with fluid pig-iron, and of decarbonizing or rendering such metal more or less malleable; or the materials may consist of any semi-fluid, granular, or more or less concrete malleable metal that has been obtained from crude or pig-iron by the action thereon of jets of air or steam, used in such quantities only as to cause the metal to lose its fluidity during the process, whether such metal shall have been produced either with or without manipulation, and the use of mill-scales or other matters used in puddling iron; or the materials may consist of any partially or wholly decarbonized iron or steel, in the state of a metallic sponge, saturated by hydrocarbons or otherwise protected from oxidation, and obtained by the deoxidation of iron-ore or otherwise, or which metallic substance is the result of any purifying or decarbonizing processes that may render the metal more or less malleable and difficult of fusion in ordinary furnaces, where crucibles are not used.

I desire it also to be understood, that my improved modes of heating and fusing malleable iron or steel are suitable for the fusion, or conversion into malleable iron and steel, of blistered steel or uncemented Swedish or other iron bars, and any wrought or scrap iron or scrap steel, such as ends or crop-ends of iron or steel rails; also, old or worn-out rails of iron or steel, and skulls or scraps and crop-ends of Bessemer steel, and all scrap or refuse pieces of malleable metal obtained in working metal fused or converted by the means herein described.

The charge of metal to be melted down by my improved means may be put into the vessel all at once, with or without a portion of pig or other carburet of iron, or it may be added in several successive portions, depending on the nature of the materials employed and the products to be obtained. The charge of metal to be fused may also, for like reasons, consist either of one kind or quality of metal only, or it may consist of such a mixture of the materials before named as may best suit the convenience or requirements of the manufacture. In some cases, a carburet of iron, rich in carbon, such as grey hematite or spiegel-eisen, may first be put into the vessel, and its heat raised either by forcing flame or combustible gases therein, mixed with atmospheric air, or by the use of air alone, after which the malleable metal to be fused may be added from time to time, and its fusion effected by forcing flame or combustible gases mixed with atmospheric air through the mixed metals; or the malleable metal may be first put into the vessel, and highly heated by the jets of flame or combustible gases, or fluid hydrocarbons, with atmospheric air and the pig-metal, if any be used, be added from time, as required. Suitable valves, under the control of the workman, will regulate, from time to time, the relative quantities of fluid hydrocarbons, or combustible gases and atmospheric air to be admitted, so as to produce an oxidizing or a reducing-flame, as desired, the movement of the vessel on its axes allowing the process to be suspended and resumed at pleasure. This movement will also facilitate the introduction of the metal to be operated upon, as well as to discharge the metal after the process is completed. The addition of spiegel-eisen, or ferro-manganese may be made previous to the discharge of the metal from the vessel, or it may be mixed with the metal in the casting-ladle prior to its being poured into moulds.

When solid fuel is to be employed for the purposes of my present invention, I prefer to use good hard coke or anthracite coal, although common coal, charcoal, or other fuel may be employed. The fuel-chamber is formed below the converter in the manner already shown and described. When, however, gaseous or liquid fuel is to be employed for the purposes of my present invention, the combustion-chamber, or tuyere-box may be much smaller, and the pipes, or tuyeres which convey the gases or fluids therein may be so directed or arranged as to facilitate the union of these matters with the blast of air. There, also, are tuyeres at the upper part of the combustion-chamber, or tuyere-box, for conveying the flame and heated matters into the melting-vessel.

In order that the mode which I prefer to employ for conveying liquid fuel or combustible gases, in combination with atmospheric air, into the melting-chamber may be fully understood, I have shown at fig. 3 of the drawings hereunto annexed a vertical section of a melting or converting-vessel, mounted on axes and arranged for that purpose.

$o$ is a plate-iron vessel, lined with gaunister, $p$.

At the lower part of the melting-vessel a tuyere-box, $q$, is attached by slotted studs $r$.

A ring of fire-clay, $s$, is fitted into this box, and serves to support the lower ring of the tuyere $t$, and keep it in place.

$u$ is a vertical pipe, secured by a flange at its lower end to the covering-plate $9'$ of the tuyere-box 9.

The upper part of the pipe $u$ is furnished with a perforated disk, $u^*$, from which the liquid or gaseous fuel is projected in numerous fine streams. When gases are employed, these perforations, as well as the pipe $u$, are of much larger dimensions.

The branch pipe $v$ communicates with one of the hollow trunnions of the melting-vessel, and from thence is put into communication with any convenient apparatus, by means of which the liquid or gaseous fuel is forced under such pressure as to cause it to enter the tuyere-box in sharp jets, through the perforations $u^*$. At the same time a blast of hot or cold air is forced into the lower part of the tuyere-box, through the opening $w$, which represents the orifice of a pipe leading to one of the hollow trunnions of the vessel or chamber, and is in communication with the blast-engine, the air from which passes upward around the pipe $u$, dashing the jets of liquid fuel into spray, or combining with the gases emitted therefrom, and passing, in combination therewith, in numerous powerful jets, into and among the red-hot pieces of malleable metal to be melted, or into and among the particles of any fluid contained in the melting-chamber, and being diffused through it in numerous fiery bubbles, whereby the metal becomes highly heated and the fusion of the solid malleable portions is effected, and the whole becomes united as a fluid malleable metal, containing more or less carbon, depending, in part, upon the original proportion of the decarbonized iron and pig-iron employed, and upon the proportion which the liquid or gaseous fuel admitted bears to the quantity of atmospheric air, and which may be so regulated from time to time, by means of suitable valves, as to render the flame oxidizing or deoxidizing, as desired.

Another modification of the mode of admitting the liquid or gaseous fuel and air in compound jets is shown at Figure 4, which is a vertical section of the apparatus. In this case the tuyere-box A is divided into two parts. Into the lower part the liquid or gaseous fuel is admitted at the orifice B, and passes upward through several small nozzles, C, the orifices of which are inserted a short distance into an enlarged part of the tuyere-passages D.

Air is admitted through the orifice E, and, passing upward around the nozzles C, enters, in the form of a combined jet, into the fluid, or among the solid pieces of metal in the melting-chamber, as hereinbefore described in reference to Figure 3.

In the combustion-chamber or tuyere-box, I sometimes employ carbonic-oxide hydrogen or carburetted hydrogen gas, or I use the gaseous products obtained from the vaporization, or from the distillation of creosote, petroleum, naphtha, coal-oil, or other hydrocarbons or matters capable of yielding combustible gases, or, as above described in respect of figs. 3 and 4, I inject the creosote, petroleum, or other hydrocarbons, in the fluid state.

Along with any or all of these combustible matters, I force in sufficient air to cause combustion, and to prevent the fluid metal from entering the tuyeres, the quantities of air and combustible gases or fluids being so apportioned as to produce a reducing or oxidizing flame, as may be desirable from time to time.

Any of the gaseous or fluid combustible matters herein lastly named or referred to may be used as compound jets with atmospheric air, or may be used as separate jets with other separate jets of atmospheric air, such jets being so directed as to unite at a point not far distant from their orifices, and be thus driven in among the pieces of metal to be fused, and into and among the particles of fluid metal resulting from such fusion, or into and among the particles of any carburet of iron that may be added thereto.

The mode of applying two separate jets, one a combustible liquid or gaseous substance, and the other atmospheric air, so as to unite at a short distance from the orifices from which they are emitted, and thus produce combustion, is shown in Figure 6 of the annexed sheet of drawings, which is a cross-section of a reverberatory furnace, in the bed of which an oblong double tuyere-block, H, is fitted.

A pipe communicates with the passage I, for the conveyance of gaseous or liquid fuel, having several tuyere-passages, J, pointing upward into the furnace.

The passage L is in communication with the blast-apparatus.

Jets of air at N are conveyed upward at an angle, to strike against the jets issuing from the opposite series of orifices J, so that the issuing matters may unite at a short distance from the orifices, and produce a powerful flame among the pieces of solid metal to be fused, or among any fluid metal that may be present in the furnace.

The matters to be fused may also be heated by a fire made at one end of the furnace, and passing over the fire-bridge O, and, being reverberated down upon the metal to be melted, the fire so employed either resulting from the combustion of solid fuel in a fire-grate behind the bridge O, or from the combustion of heated air and gases in what is generally known as a gas-furnace.

I would observe that when employing, in combination with furnace-heat, jets of air and jets of gaseous or liquid fuel, to unite below the fluid or other metal to be heated, that I prefer to employ such jets toward the conclusion of the heating-process, so as to assist the action of such furnaces, and render them more rapid, and for this purpose I cover over the orifices of the tuyere-block H with some fire-clay and sand mixed together, or with some other fire-resisting material, previous to putting in the materials to be fused; and when the matters to be melted have acquired a very high temperature, approaching fusion, I then suddenly turn on the blast and liquid or gaseous fuel, which will blow off the luting with which the orifices were covered, and commence to further heat the metal by the energetic action produced by their combustion below the metal.

As soon as the whole of the materials is fused and blended, the metal may be tapped out of the furnace and run into a ladle, and mixed with other metal, as before described.

I would also remark that the employment of jets crossing each other, or uniting only after having escaped from their respective orifices, is also applicable to the movable vessels or chambers hereinbefore described.

When gaseous, fluid, or solid fuel is employed for the purposes of my invention, I prefer to use the atmospheric air necessary to support their combustion in a highly-heated state. The gaseous fuel may also be highly heated by any of the methods known and in use for heating air or gases; but if it be preferred, the gas and air may both be used at the ordinary temperature.

Part of my invention also consists in using such jets of flame from solid fuel, or jets of flame from the several gaseous matters or fluid fuels before named, or compound jets or separate jets of combustible matters and air, as hereinbefore named or referred to, for the purpose of fusing pig or cast-iron, for the several purposes for which such metal may be used, either alone or with such quantities of partially-refined or of malleable metal as may improve in quality the castings made therefrom, or which may render such molten iron better suited for the purposes for which it may be employed.

In some cases it may be found desirable, when melting pig-iron in the manner hereinbefore described, to further carbonize the metal by employing carbonic-oxide or other gas in excess during or after the fusion of the metal.

I also desire it to be understood that air alone may be passed through the tuyeres at any stage of the operation, if found desirable either as a heating or decarbonizing agent, and although I have herein described my invention as consisting in the employment of jets or streams of fire, or jets of gases or fluid hydrocarbons and air, producing combustion by their union in or below the surface of the metal, I nevertheless do not confine myself to this mode of introducing fire into the fluid metal in the form of jets, as the same or similar results may be obtained by dividing a furnace or vessel into two or more parts, separated by an inverted bridge or partition, the metal to be fused occupying one part, and the combustible matters and air being forced into the others, from the lower part of which the fluid portion of the metal will be displaced by the force of the injected matters, the flame and heat passing up from beneath the partitions through the fluid, and among the solid portions of the metal in the other chamber.

A furnace or chamber suitable for carrying into operation this modification of my invention, is represented in vertical cross-section in Figure 5 of the annexed drawings.

It consists of a square or rectangular sheet of iron, Q, lined with brick-work or gannister.

A fuel-chamber is formed at R, having a door at R*, for the supply of fuel, which door is secured by a faced joint and luting, so as to prevent the escape of gaseous products therefrom.

At S S are blast-pipes, which convey air through two rows of small tuyeres T, into the fuel-chamber.

The melting or converting-chamber U contains the metal to be melted, and which may be supplied through a door at U*, or it may be put in at the opening U', through which the sparks and products of combustion escape.

An opening, W, stopped with loam, is also provided, for running off the metal when melted.

There is an inverted fire-bridge or partition formed at X, beneath which the flame and heated products of combustion pass from the chamber R up among the pieces of metal to be fused, and up through the fluid metal contained therein.

The fire thus brought into direct contact with or diffused through the fluid metal will rapidly bring the metal up to an intense heat, and fuse and unite the whole, which may then be run off and employed as desired; and although I have herein shown the mode by which I cause the flame and products of combustion from solid fuel to act upon and enter into the fluid metal, without the employment of tuyeres for that purpose, I desire it to be understood that this modification of my invention is also applicable in those cases where liquid or gaseous fuel is employed, and I would further observe that in some cases two fire-bridges in close proximity may be employed, air escaping from beneath one of them, and gas from beneath the other, so as to unite, and, by producing the flame, operate direct upon the metal.

In some cases, also, it may be found desirable to introduce flame or combustible matters in jets or streams, horizontally or downward, upon the mass of metal to be heated or fused, in addition to the jets forced up through the metal from below.

But I desire it to be understood that I lay no claim to the employment of such jets of flame or gaseous or liquid fuel when applied downward or horizontally, or when not employed to fuse or assist in fusing malleable iron or steel, or other partially decarbonized or more or less malleable metal or cast or other carburet of iron.

Having thus described the nature of my said invention, and the manner of performing the same, I would have it understood that I do not confine myself to the exact details described; but

I claim the fusion of solid pieces of malleable iron or steel, or of iron which has been more or less decarbonized or rendered partially malleable, mixed with pig or other carburet of iron, in a molten or solid state, by means of a jet or jets of flame and heated products arising from the combustion of coke, coal, or other solid fuel, when such jet or jets of flame and products of combustion are made to enter among the said metal up through such portion of the metal as is molten or becomes molten during the operation.

Also, the fusion of solid pieces of malleable iron or steel, or of iron which has been more or less decarbonized or rendered partially malleable, mixed with pig or other carburet of iron, in a molten or solid state, by means of a compound or combining-jet or jets of gaseous or fluid fuel and air, or a jet or jets of flame and heated products arising from the combustion of gaseous or fluid fuel, when such jet or jets are made to enter among the said metal up through such portion of the metal as is molten or becomes molten during the operation.

Also, the manufacture of cast-steel or cast malleable iron, by fusing malleable iron or steel, or iron which has been more or less decarbonized, or rendered partially malleable, mixed with pig or other carburet of iron, by means of a jet or jets of flame, or of gaseous or fluid fuel and air, when such jets are made to enter among the metal up through such portion of the metal as is molten or becomes molten during the operation.

Also, the treating and raising the temperature of molten iron or steel, by means of a jet or jets of flame, or of a compound or combining-jet or jets of gaseous or fluid fuel and air, when such jet or jets are forced into the iron or steel at the bottom of the containing-vessel, and rise up through the molten metal.

Also, the fusion of solid pieces of malleable iron or steel, or of iron which has been more or less decarbonized or rendered partially malleable, mixed with pig or other carburet of iron, by the use, in the same vessel of a jet or jets of flame, or of a compound or combining-jet or jets of gaseous or fluid fuel and air, and a jet or jets of air alone, or without fuel, such jet or jets of air alone, or without fuel, being applied either before or after the flame or compound or combining-jet or jets, or simultaneously therewith, and the several jets being made to enter among the metal up through such portion of the metal as is molten, or becomes molten during the operation.

Also, the melting of pig or other cast-iron, by means of a jet or jets of flame and heated products of combustion, from solid fuel or gaseous fuel and atmospheric air, or by means of compound or combining-jets of fluid or gaseous fuel and air, when such jets are forced up among the pig or other cast-iron, so as to rise up through the molten portions thereof as the fusion progresses. Such gaseous matters so injected may have an oxidizing, carbonizing, or neutral flame, as desired.

Also, the employment of a jet or jets of flame and heated products of combustion, arising from solid, fluid, or gaseous fuel and atmospheric air, or of compound or combining-jets of fluid or gaseous fuel and air, when such jets are forced upward through fluid iron or steel, contained in a gas or other reverberatory furnace.

Also, the employment of melting or converting-vessels, mounted on axes, and having a fire or fuel-chamber attached thereto, for the purposes hereinbefore described.

Also, the employment of melting or converting-vessels, having a combustion-chamber or tuyere-box, arranged for the combustion or conveyance into the metal of liquid or gaseous combustible matters and atmospheric air, as hereinbefore described.

Also, the fusion of pig-iron or other carburet of iron, or of malleable iron or steel, or iron in a more or less decarbonized or malleable state, in furnaces or apparatus in which flame and products of combustion are passed beneath an inverted fire-bridge or partition, and thence upward among the pieces of metal to be fused, or upward and among the particles of any fluid metal arising from the fusion of such pieces of metal, or of any molten pig-iron that may be employed in addition thereto.

HENRY BESSEMER.

Witnesses:
DAVD. LONGSDON,
   Catford Hill, Forest Hill.
G. F. WARREN,
   No. 17 Gracechurch Street, London, E. C.